United States Patent
Lee et al.

(10) Patent No.: US 6,304,046 B1
(45) Date of Patent: Oct. 16, 2001

(54) DRIVING CONTROL CIRCUIT OF A HOOD MOTOR

(75) Inventors: Sung-ho Lee; Young-won Cho, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/501,645

(22) Filed: Feb. 10, 2000

(30) Foreign Application Priority Data

Oct. 5, 1999 (KR) .............................................. P99-42864
Oct. 5, 1999 (KR) .............................................. P99-42865

(51) Int. Cl.$^7$ ................................................. H01R 39/46
(52) U.S. Cl. ......................... 318/439; 318/772; 318/806; 318/739; 318/749; 318/740; 318/751; 318/778; 318/785; 318/786
(58) Field of Search .................................. 318/439, 772, 318/806, 739, 740, 749, 751, 778, 785, 786

(56) References Cited

U.S. PATENT DOCUMENTS

| | | | |
|---|---|---|---|
| 3,845,373 | * 10/1974 | Totsu et al. | 318/434 |
| 5,625,538 | * 4/1997 | Lee et al. | 363/15 |
| 6,008,998 | * 12/1999 | Han | 363/16 |
| 6,037,576 | * 3/2000 | Okabayshi et al. | 318/434 |
| 6,148,620 | * 11/2000 | Kumagai et al. | 318/434 |
| 6,166,929 | * 12/2000 | Ma et al. | 363/37 |
| 6,172,476 | * 1/2001 | Tolbert, Jr. et al. | 318/772 |

* cited by examiner

*Primary Examiner*—Karen Masih
(74) *Attorney, Agent, or Firm*—Robert E. Bushnell, Esq.

(57) ABSTRACT

A driving control circuit of a hood motor, including: a hood motor section rotatably driven for ventilating the inner portion of a system; a rectifier circuit section for supplying direct current power to the hood motor by rectifying alternating current power, a controlling section for generating a control signal for controlling the operation of the hood motor; and a driving circuit section for controlling the operation of the hood motor according to the control signal from the controlling section.

21 Claims, 10 Drawing Sheets

DRIVING CONTROL CIRCUIT OF A HOOD MOTOR

CLAIM OF PRIORITY

This application makes reference to, incorporates the same herein, and claims all benefits accruing under 35 U.S.C. §119 from applications for ROTATION SPEED CONTROL CIRCUIT OF A HOOD DC MOTOR FOR A MICROWAVE OVEN OVER THE RANGE earlier filed in the Korean Industrial Property Office on the 5$^{th}$ of October 1999 and there duly assigned Ser. Nos. 42864/1999 and 42865/1999.

BACKGROUND OF THE INVENTION

1. Field of the Invention

The present invention relates to a driving control circuit of a hood motor, and more particularly to a driving control circuit of a hood motor for controlling rotational speeds of the hood motor.

2. Description of the Related Art

Generally, a hood motor ventilates heat generated under a microwave oven installed over the range (hereinafter called OTR microwave oven), and the smell of foods cooked by the range. The OTR microwave oven having the hood motor is usually installed over a gas range, performing not only a basic function thereof, i.e., the cooking function using microwaves, but also a ventilating function for venting smoke generated during the cooking operation of the gas range.

FIG. 1 is a view for showing a conventional OTR microwave oven installed, and FIG. 2 is a view for schematically showing the inner portion of the OTR microwave oven.

As shown in FIG. 1, the OTR microwave oven includes a body 10 having a cooking chamber 11 therein. On a lower side of the cooking chamber 11, a hood lamp 12 is disposed, while vent ducts 14 are disposed on the left and right sides of the cooking chamber 11.

Further, a hood motor M is installed at the middle rear portion of the cooking chamber 11, and vent blowers 18 are disposed on the left and right sides of the hood motor M. Upper portions of the vent blowers 18 are connected with a connective tube 20, and a vent passage 22.

Accordingly, vapor or smoke generated during the cooking operation of the gas range are drawn into the vent ducts 14 by the rotation of the vent blowers 18, and are exhausted outside through the connective tube 20 and the vent passage.

FIG. 3 is a view for showing the rotational velocity control circuit of the hood motor shown in FIG. 2.

As shown in FIG. 3, the conventional rotational velocity control circuit of the hood motor includes a power on/off switch 330, a rotational velocity selecting switch 332, a temperature sensor 334, and a hood motor M.

The rotational velocity selecting switch 332 selects the rotational velocity of the hood motor M, while being selectively switched on to a low-velocity contact L for selecting the low velocity mode, or to a high-velocity contact H for selecting the high velocity mode.

The hood motor M includes an alternating current (hereinafter called AC) motor selectively rotated at a low or a high velocity in accordance with the selected mode of the low/high velocity contacts L or H.

The temperature sensor 334 senses the temperature of a driving coil in the hood motor M, and has increasing resistance value corresponding to the rise in temperature.

Meanwhile, the presence of foreign substances in the vent blowers 18 of the hood motor M causes a constraint on the rotation of the hood motor M, and accordingly, the temperature of the driving coil is excessively increased. As a result, the resistance value of the temperature sensor 334 is significantly increased, cutting off the application of AC power to the hood motor M.

The conventional control circuit for controlling the rotational velocity of the hood motor M, however, has shortcomings of high manufacturing cost and a low productivity due to its expensive AC motor and temperature sensor.

Further, in the conventional hood motor control circuit, since the low/high velocity contacts of the rotational velocity selecting switch are formed to be mechanically switched on/off to control the rotational velocity of the hood motor M, there is a high possibility of having poor contacts due to frequent switching, and the danger of fire due to spark at the contacts.

SUMMARY OF THE INVENTION

The present invention has been developed to overcome the above-described problems of the related art, and accordingly, it is an object of the present invention to provide a driving control circuit of a hood motor having a direct current motor as a hood motor, which is capable of not only controlling the rotational velocity of the direct current motor, but also capable of protecting circuit components from possible abnormalities of the motor.

The above object is accomplished by a driving control circuit of a hood motor according to the present invention, including: a hood motor rotatably driven for ventilating the inner portion of a system; rectifier circuit means for rectifying an alternating current voltage into a direct voltage, and for supplying direct current voltage to the hood motor; controlling means for generating a control signal for controlling the operation of the hood motor; and driving circuit means for controlling the operation of the hood motor according to the control signal from the controlling means.

As described above, according to the present invention, the manufacturing cost of the microwave oven can be reduced, while the productivity is improved, and the stable operation of the motor can be guaranteed since the abnormalities thereof such as a poor contact of switch contacts, etc. are prevented. Further, when there is an abnormality in the operation of the hood motor, the circuit is automatically cut off, preventing a possible overload at the motor.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENT

Hereinafter, the preferred embodiment of the present invention will be described in greater detail with reference to the accompanied drawings.

Figure 1:
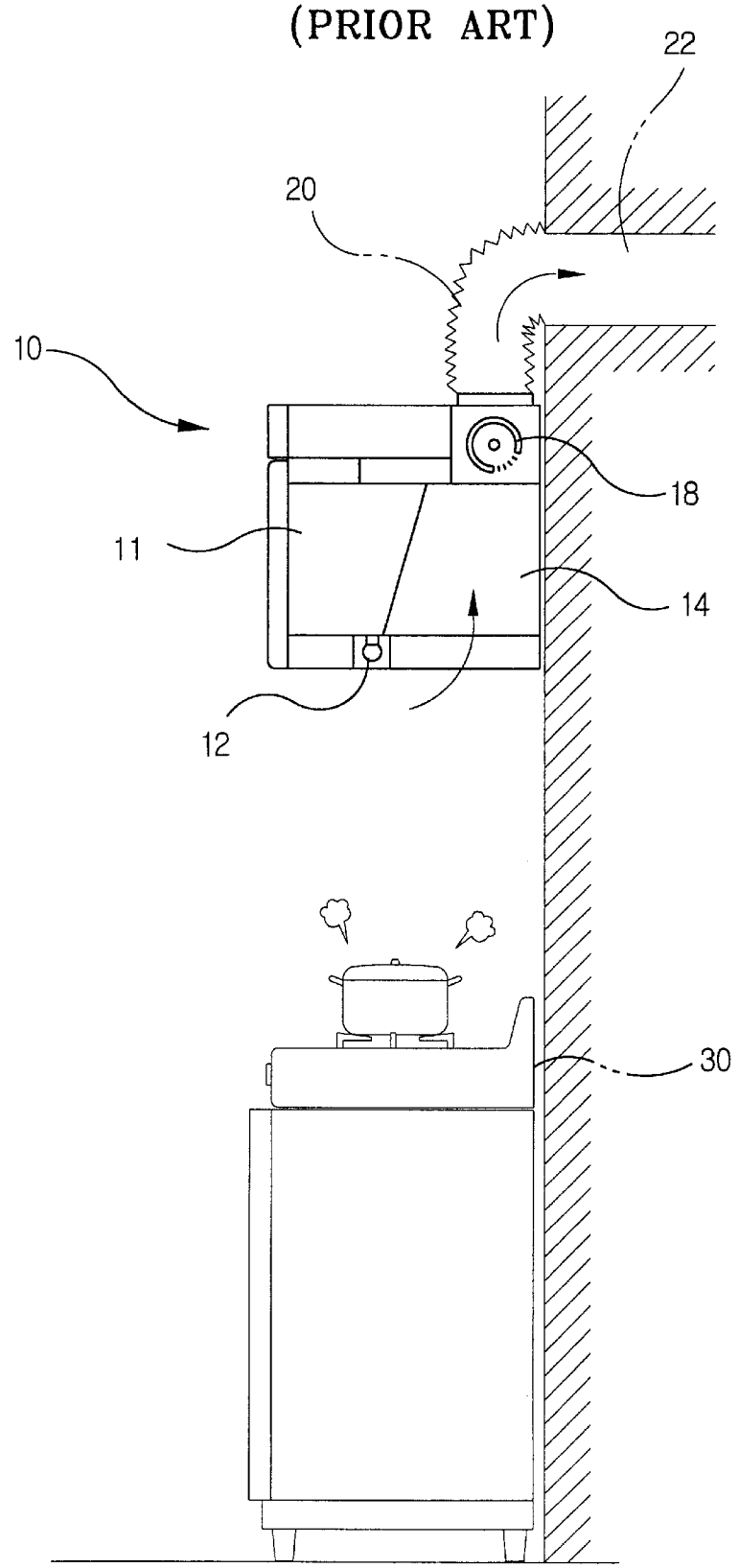
FIG. 1 is a view of a conventional over-the-range microwave oven.
Figure 2:
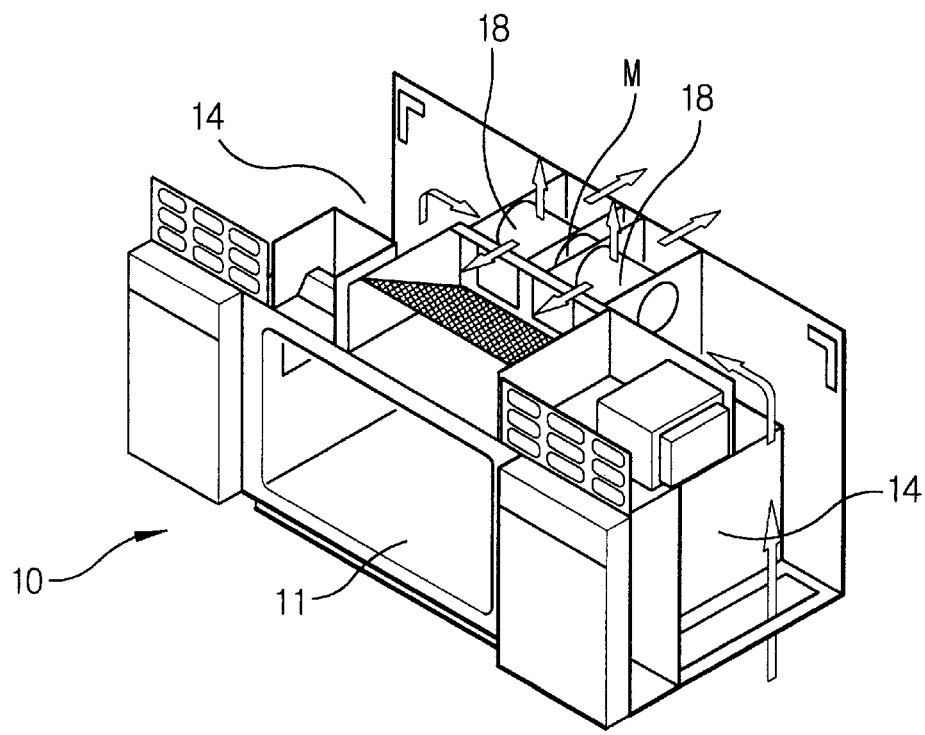
FIG. 2 is a view for schematically showing the inner portion of the over-the-range microwave oven shown in FIG. 1.
Figure 3:
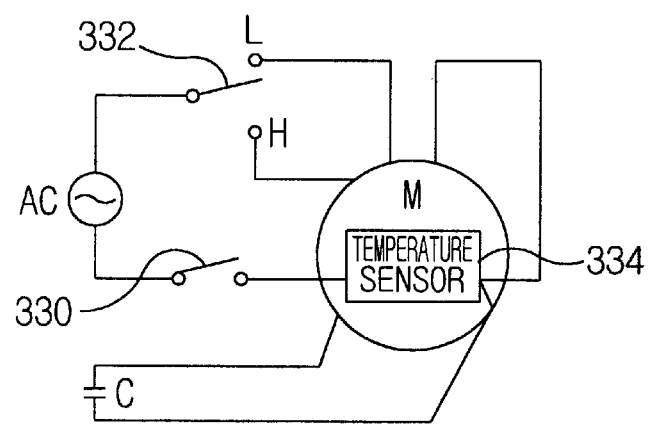
FIG. 3 is a view for showing a rotational velocity control circuit of the hood motor shown in FIG. 2.
Figure 4:
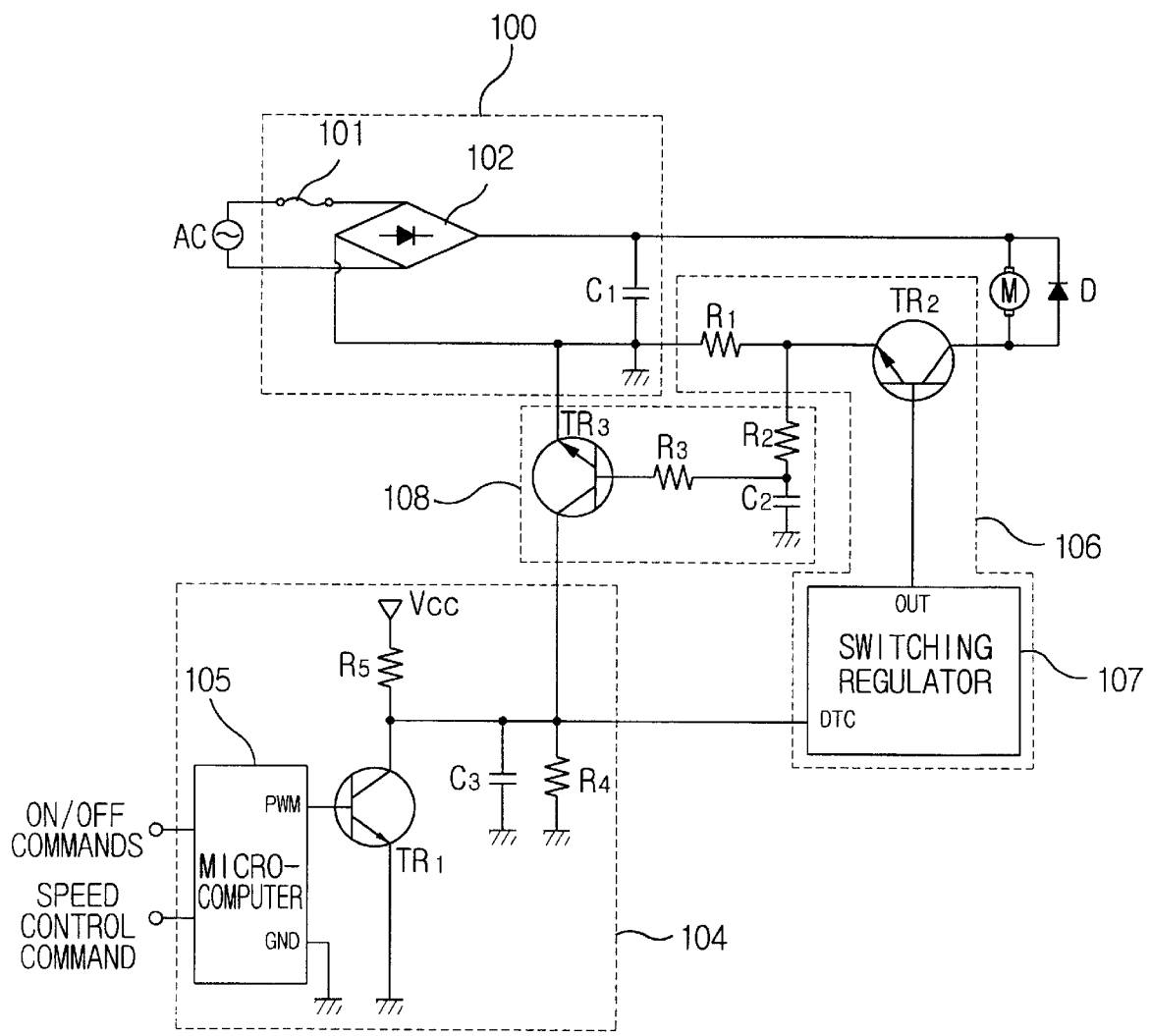
FIG. 4 is a view for showing a hood motor driving control circuit according to a first preferred embodiment of the present invention.

FIG. 4 is a view for showing a hood motor driving control circuit according to a first preferred embodiment of the present invention.

As shown in FIG. 4, the driving control circuit of a hood motor according to the first preferred embodiment of the present invention includes a rectifier circuit section 100, a controlling section 104, a driving circuit section 106, an overload prevention circuit 108, and a direct current hood motor M (hereinafter called DC hood motor).

The rectifier circuit section 100 includes a fuse 101 for cutting off commonly used alternating current (hereinafter called AC) when there is overvoltage of AC, a bridge diode 102 for full-wave rectifying the AC, and a smoothing capacitor C1 for smoothing the full-wave rectified DC.

The controlling section 104 includes a microcomputer 105, and a first transistor TR1. The microcomputer 105 includes a control signal input port for inputting on/off commands and rotational velocity control command from a user, a control signal output port PWM for generating a control signal, and a ground port GND.

The first transistor TR1 includes a base connected with the control signal output port PWM, and a collector connected with a voltage source Vcc through a resistor R5. Between the collector and the resistor R5 of the first transistor TR1, the driving circuit section 106 is connected. Between the first transistor TR1 and the driving circuit section 106, a capacitor C3 and a resistor R4 are parallel connected, respectively.

Here, the microcomputer 105 generates a pulse width modulation (hereinafter called PWM) control signal of a certain frequency having varied duty cycle according to the high or low velocity rotation of the DC hood motor M, in response to the on/off command and the rotational velocity control command from the user.

The first transistor TR1 is on/off driven according to the duty cycle of the PWM control signal received at the base thereof from the microcomputer 105, and outputs a phase-inverted pulse signal through the collector thereof The pulse signal generated from the collector of the first transistor TR1 is outputted to the driving circuit section 106 in the form of DC power by the charging operation of the capacitor C3.

The driving circuit section 106 includes a switching regulator 107, a second transistor TR2, and a resistor R1.

The switching regulator 107 includes a signal input port DTC connected with the collector of the first transistor TR1, and a signal output port OUT for outputting a certain driving pulse signal. The second transistor TR2 includes a base connected with the signal output port OUT of the switching regulator 107, a collector connected with one end of the DC hood motor M, and an emitter connected with the rectifier circuit section 100 through the resistor R1.

The switching regulator 107 receives the DC voltage generated by the capacitor C3 from the collector of the first transistor TR1 through the signal input port DTC, and outputs the driving pulse signal of a certain frequency having the duty cycle determined by the voltage level of the DC power.

Here, the switching regulator 107 is normally driven by the DC voltage of a certain voltage range, such as 0.7V–3V, inputted through the signal input port DTC.

The switching regulator 107 generates the driving pulse signal having a first duty cycle with a short period of on-time and a long period of off-time of second transistor TR2 when the DC voltage inputted to the signal input port DTC is high voltage such as 3V. While, when the low voltage such as 1V is inputted, the driving pulse signal having a second duty cycle with a long period of on-time and a short period of off-time of second transistor TR2 is generated.

The second transistor TR2 is on/off driven according to the duty cycle of the driving pulse signal received at the base thereof from the switching regulator 107. The resistor R1 is a voltage reducing element for forming potential difference for driving the second transistor TR2.

The DC hood motor M is rotated at high or low velocity, by the electric current received from the rectifier circuit section 100 in accordance with the on/off driving of the second transistor TR2.

Further, the overload prevention circuit 108 includes a third transistor TR3, voltage dividing resistors R2 and R3, and a capacitor C2.

The third transistor TR3 includes a base connected between the second transistor TR2 of the driving circuit section 106 and one end of the resistor R1 through the voltage dividing resistors R2 and R3, and an emitter connected with the other end of the resistor R1. Further, the third transistor TR3 includes a collector connected between the collector of the first transistor TR1 and the signal input port DTC of the switching regulator 07.

The third transistor TR3 is on/off driven by the voltage at both ends of the resistor R1 of the driving circuit section 106, to control the DC voltage applied to the signal input port DTC of the switching regulator 107.

The voltage dividing resistors R2 and R3 divide the voltage at both ends of the resistor R1, and the third transistor TR3 is on/off driven by the voltage at the resistor R3. The capacitor C2 is for protecting the third transistor TR3.

Next, the first preferred embodiment of the present invention constructed as above will be described in greater detail with reference to the waveforms of FIGS. 5, 6, 7, and 8.

Figure 5:
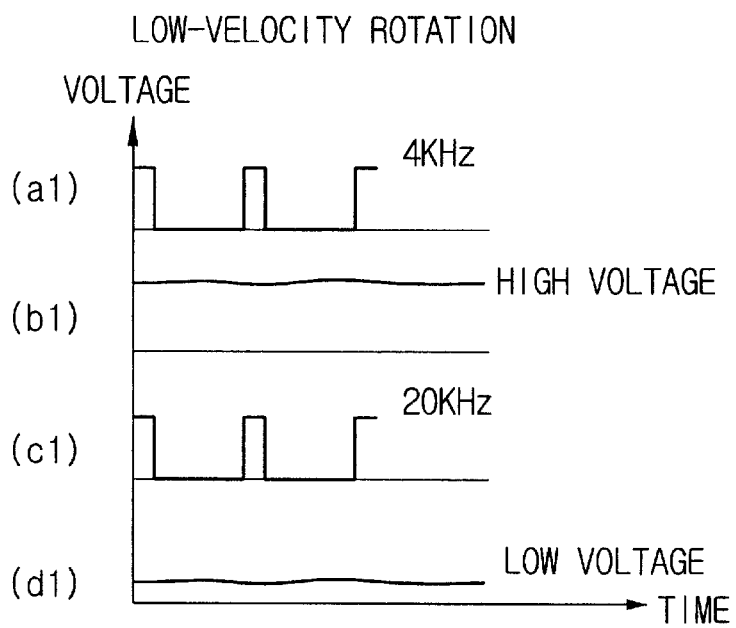
FIGS. 5 and 6 are waveforms for explaining the operation of the control circuit of FIG. 4, when the hood motor is normally operated.

First, when the user selects the command for controlling the low velocity while giving the hood motor-on command, as shown in FIG. 5, the microcomputer 105 outputs the PWM control signal a1 of a certain frequency, such as the frequency of 4 KHz having the first duty cycle with a short period of on-time and a long period of off-time of first transistor TR1 through the control signal output port PWM.

The first transistor TR1 is on/off driven according to the first duty cycle of the PWM control signal generated from the microcomputer 105, to generate the phase-inverted pulse signal through the collector thereof Accordingly, the pulse signal generated at the collector of the first transistor TR1 has the duty cycle which is increased as the first duty cycle thereof is inverted.

Meanwhile, the capacitor C3, which is connected with the collector of the first transistor TR1, generates a certain high voltage b1 such as the DC voltage of 3V by charging/discharging the pulse signal having the increased duty cycle.

When the switching regulator 107 of the driving circuit section 106 receives the DC voltage b1 of the high voltage discharged by the capacitor C3 such as the voltage of 3V through the signal output port OUT, the switching regulator 107 outputs a certain high frequency having the first duty cycle corresponding to the high voltage, such as a driving pulse signal c1 of frequency of 20 KHz.

Accordingly, the driving-on time of the second transistor TR2 is shortened to be shorter than the driving-offtime thereof by the first duty cycle of the driving pulse signal c1 generated from the switching regulator 107, so that the DC hood motor M is rotated at low velocity.

In such a situation, as there is low voltage d1 such as the voltage of 1V at both ends of the resistor R1, the third transistor TR3 of the overload prevention circuit 108 is not operated.

Figure 6:
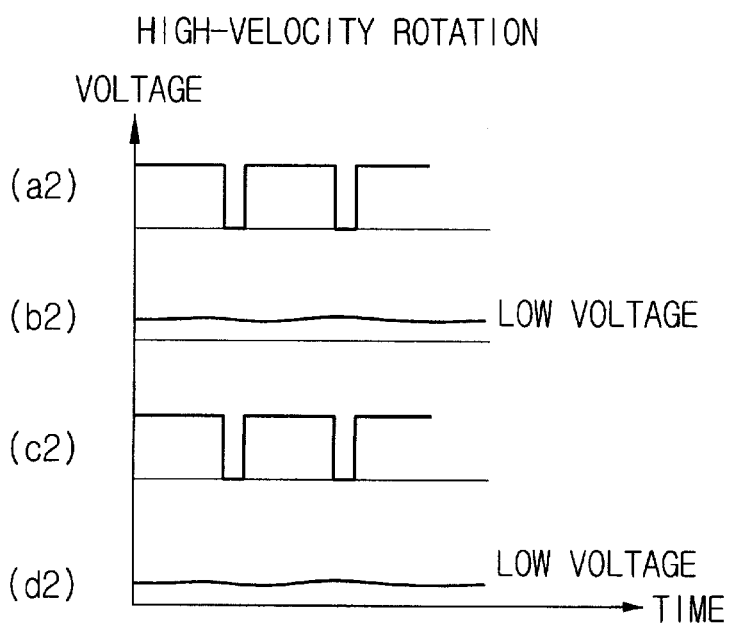

Meanwhile, when the user inputs his/her command for velocity control of the high rotation of the DC hood motor M, as shown in FIG. 6, the microcomputer 105 outputs a certain PWM control signal a2 of a high frequency having a second duty cycle with a long period of on-time and a short period of off-time of first transistor TR1, such as a PWM control signal of frequency of 4 KHz.

At the collector of the first transistor TR1, the second duty cycle of the PWM control signal is inverted, generating the pulse signal of the first duty cycle. The capacitor C3 generates a certain low voltage b2 such as the DC voltage of 1V, by charging the pulse signal of the first duty cycle.

The switching regulator 107 generates a certain driving pulse signal c2 of high frequency having the second duty cycle such as the driving pulse signal of frequency of 20 KHz, by the low DC voltage d2 discharged from the capacitor C3.

Accordingly, due to the driving pulse signal c2 having the second duty cycle, the driving-on time of the second transistor TR2 is lengthened to be longer than the driving-offtime thereof, and the DC hood motor M is rotated at high velocity.

In such a situation, the third transistor TR3 of te overload prevention circuit 108 is not operated since the voltage at both ends of the resistor R1 does not have voltage value enough for the turning-on condition thereof.

Figure 7:
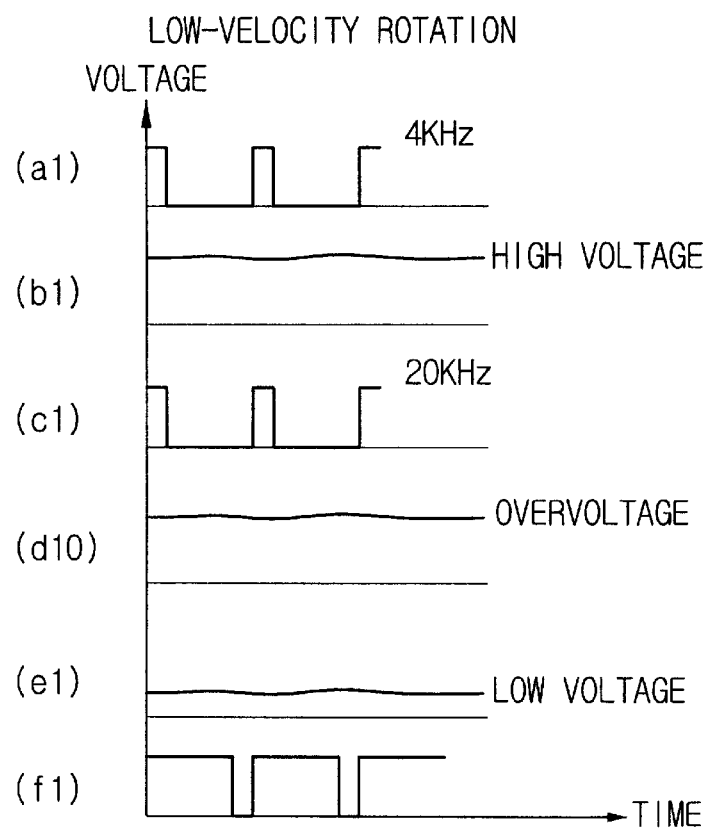
FIGS. 7 and 8 are waveforms for explaining the operation of the control circuit of FIG. 4, when the hood motor is abnormally operated.
Figure 8:
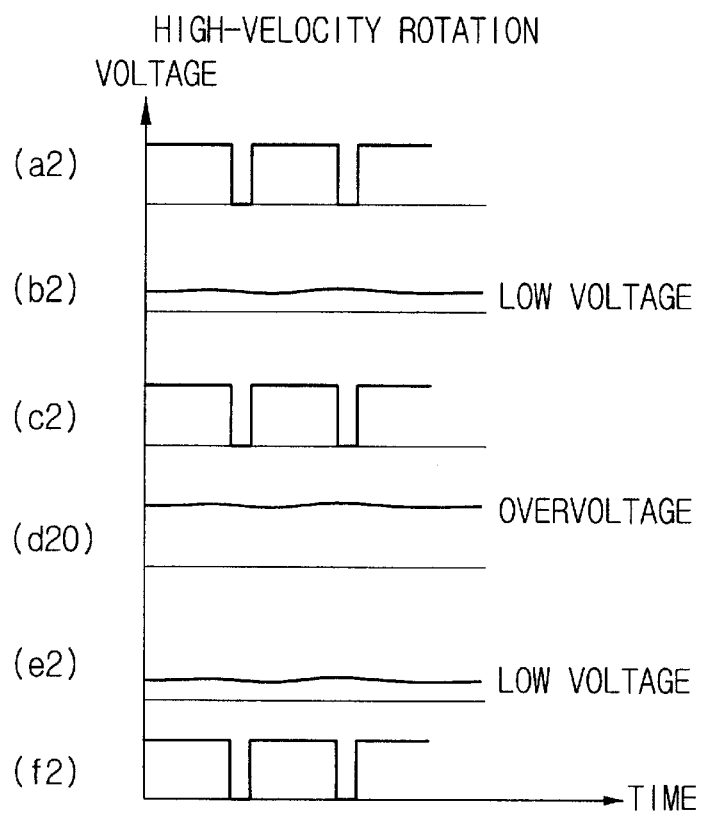

FIGS. 7 and 8 are waveforms for explaining the operation of the control circuit when the hood motor is abnormally operated.

As shown in FIG. 7, while the DC hood motor M is rotated at low velocity, the overvoltage d10 is generated at both ends of the resistor R1 when there is a foreign substance in the vent blowers of the DC hood motor M, which causes the constrains on the rotation of the DC hood motor M, and the electric current increase at the resistor R1.

When there occurs the overvoltage d10 at both ends of the resistor R1, the third transistor TR3 of the overload prevention circuit 108 is turned on to bypass the DC voltage inputted through the signal input port DTC of the switching regulator 107 toward the rectifier circuit section 100.

Accordingly, as the low voltage e1 is applied to the signal input port DTC, the switching regulator 107 generates the driving pulse signal f1 having the second duty cycle through the signal output port OUT.

Since the driving pulse signal f1 has the second duty cycle, the driving-on time of the second transistor TR2 is lengthened to be longer than the driving-offtime thereof, so that the electric current flows in excess through the rectifier circuit section 100 than the fuse 101 of the rectifier circuit section 100 allows. Accordingly, the fuse 101 is opened.

By the opening of the fuse 101, the operation of the DC hood motor M is stopped, and the possible harm by the overcurrent is prevented.

Meanwhile, as shown in FIG. 8, while the DC hood motor M is rotated at high velocity by the user's selection, the overvoltage d20 is generated at both ends of the resistor R1 and the third transistor TR3 of the overload prevention circuit 108 is turned on if there is a foreign substance constraining the rotation of the DC hood motor M.

Accordingly, by the turning-on of the third transistor TR3, the low voltage e2 is applied to the signal input port DTC of the switching regulator 107, while the driving pulse signal f2 of the second duty cycle is outputted through the signal output port OUT.

Accordingly, since the second duty cycle of the driving pulse signal f2 has a long period of on-time and a short period of off-time, the driving-on time of the second transistor TR2 is lengthened to be longer than the driving-offtime thereof, and the fuse 101 is opened since there is overcurrent than the fuse 101 allows.

Next, the second preferred embodiment of the present invention will be described in greater detail with reference to the accompanying drawings.

Figure 9:
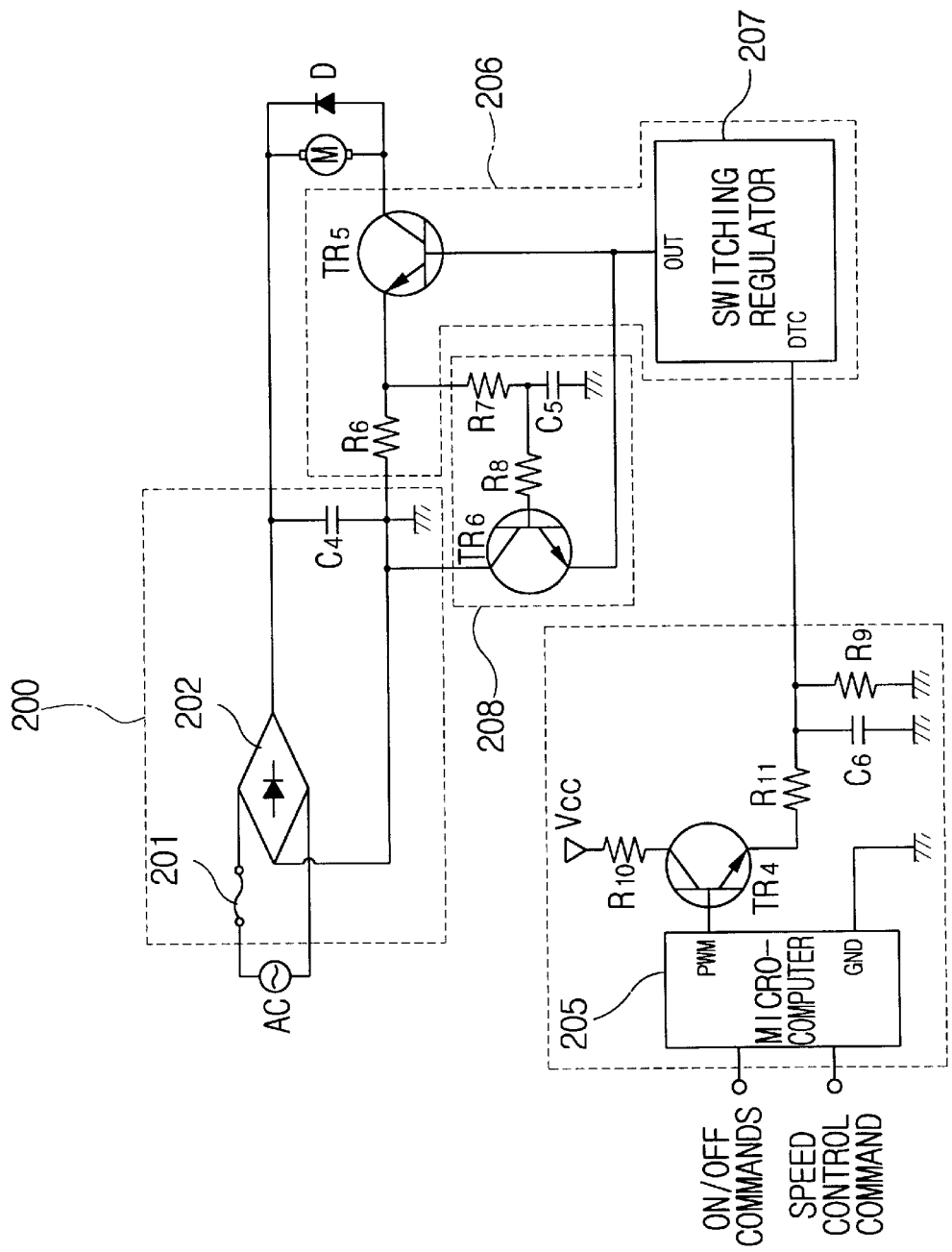
FIG. 9 is a view for showing a driving control circuit of a hood motor according to a second preferred embodiment of the present invention.

FIG. 9 is a view of the driving control circuit of a hood motor according to the second preferred embodiment of the present invention.

As shown in FIG. 9, the driving control circuit of the hood motor according to the second preferred embodiment of the present invention includes a rectifier circuit section 200, a controlling section 204, a driving circuit section 206, an overload prevention circuit 208, and a DC hood motor M.

The rectifier circuit section 200 includes a fuse 201, a bridge diode 202, and a smoothing capacitor C4.

The controlling section 204 includes a microcomputer 205, and a fourth transistor TR4.

The microcomputer 205 includes an input port for inputting on/off commands and a velocity control command from a user. Further, the microcomputer 205 includes a control signal output port PWM for generating a PWM control signal of a certain frequency having the duty cycle varied according to the high/low velocity rotation of the DC hood motor M in response to the on/off command and the velocity control command from the user, and a ground port GND.

Here, the microcomputer 205 generates the PWM control signal of a certain frequency having the second duty cycle such as the frequency of 4 KHz when the low velocity rotation is selected by the user, while the microcomputer 205 generates the PWM control signal of the first duty cycle when the high velocity rotation is selected.

The fourth transistor TR4 includes a base connected with the control signal output port PWM of the microcomputer 205, and a collector connected with the voltage source Vcc through the resistor R10. Further, an emitter of the fourth transistor TR4 is connected with the driving circuit section 206 through the resistor R11. Between the emitter of the fourth transistor TR4 and the driving circuit section 206, a capacitor C6 and a resistor R9 are parallel connected, respectively.

The fourth transistor TR4 is on/off driven according to the duty cycle of the PWM control signal received at the base thereof from the microcomputer 205, and outputs the pulse signal of the same phase as the PWM control signal through the emitter. The pulse signal generated at the emitter of the fourth transistor TR4 is outputted to the driving circuit section 206 in the form of DC voltage by the charging/discharging of the capacitor C6.

The driving circuit section 206 includes a switching regulator 207, a fifth transistor TR5, and a resistor R6.

The switching regulator 207 outputs a certain driving pulse signal of acertain frequency having the duty cycle varied according to the level of DC voltage generated by the charging/discharging of the capacitor C6 through the signal input port DTC, such as the driving pulse signal of frequency of 20 KHz, through the signal output port OUT.

Here, if the high DC voltage such as the voltage of 3V is inputted through the signal input port DTC of the switching regulator 207, the switching regulator 207 generates the driving pulse signal having the first duty cycle, while the switching regulator 207 generates the driving pulse signal having the second duty cycle when the low voltage such as the voltage of 1V is inputted.

The fifth transistor TR5 is on/off driven according to the duty cycle of the driving pulse signal received at the base from the switching regulator 207.

The overload prevention circuit 208 includes a sixth transistor TR6, voltage dividing resistors R7 and R8, and a capacitor C5.

The sixth transistor TR6 includes a base connected between the fifth transistor TR5 of the driving circuit section 206 and one end of the resistor R6 through the voltage dividing resistors R7 and R8, and a collector connected to the other end of the resistor R6. An emitter of the sixth transistor TR6 is connected with the signal output port OUT of the switching regulator 207.

The sixth transistor TR6 is on/off driven by the voltage at both ends of the resistor R6 of the driving circuit section 206 to control the driving pulse signal outputted from the signal output port OUT of the switching regulator 207.

Next, the operation of the second preferred embodiment of the present invention will be described in greater detail with reference to FIGS. 10, 11, 12, and 13.

Figure 10:
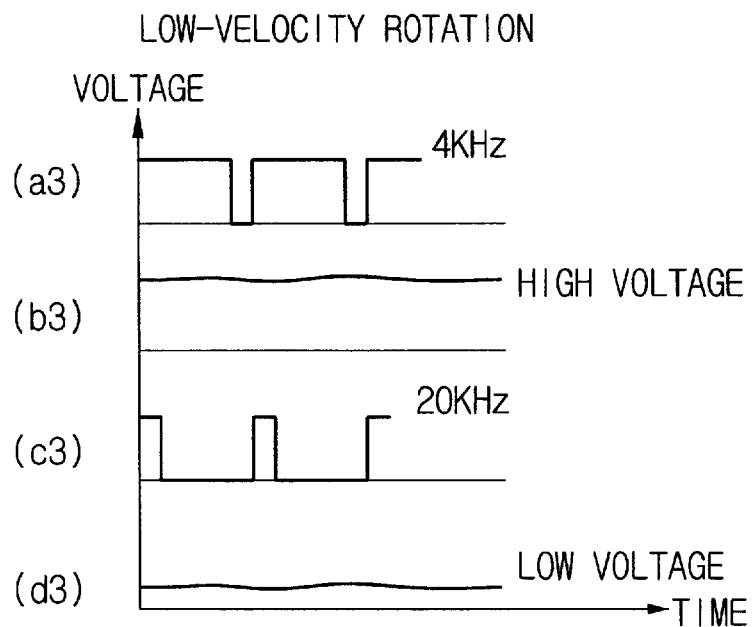
FIGS. 10 and 11 are waveforms for explaining the operation of the control circuit of FIG. 9, when the hood motor is normally operated.
Figure 11:
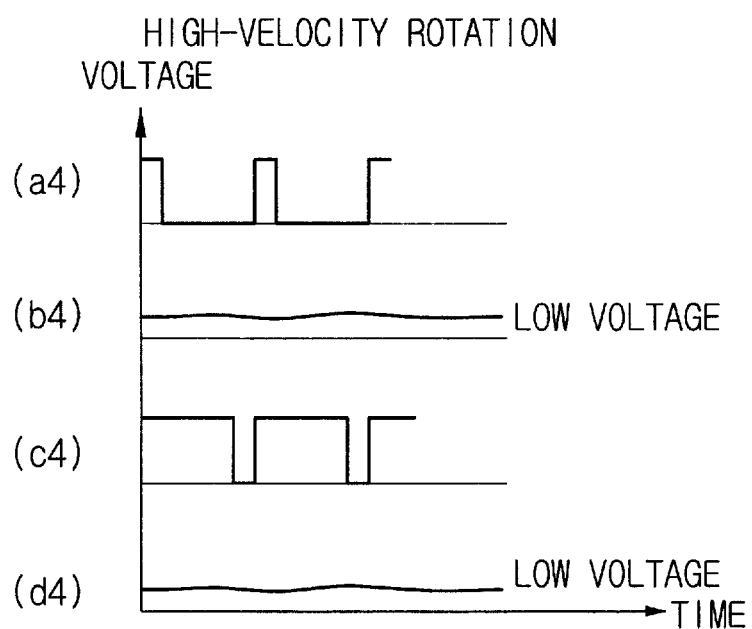

FIGS. 10 and 11 are waveforms for explaining the operation of the control circuit of the hood motor when the hood motor is normally operated.

As the user selects the low-velocity rotation while giving the DC hood motor-on command, as shown in FIG. 10, the microcomputer 205 outputs a PWM control signal a3 of the second duty cycle through the control signal output port PWM.

The fourth transistor TR4 is on/off driven according to the second duty cycle of the PWM control signal a3 generated from the microcomputer 205, and generates the pulse signal having the same phase as the PWM control signal a3 through the emitter thereof Meanwhile, the capacitor C6 generates a certain high DC voltage b3 such as the voltage of 3V by charging/discharging the pulse signal having the second duty cycle.

The switching regulator 207 of the driving circuit section receives the high DC voltage b3 discharged by the capacitor C6 through the signal input port DTC, and outputs a certain driving pulse signal c3 of high frequency having the first duty cycle, such as the frequency of 20 KHz, through the signal output port OUT.

Accordingly, the driving-on time of the fifth transistor TR5 is lengthened to be longer than the driving-offtime thereof according to the first duty cycle of the driving pulse signal c3 generated from the switching regulator 207, so the DC hood motor M is rotated at low velocity.

Here, since the voltage d3 at both ends of the resistor R6 is low voltage, such as the voltage of 1V, the sixth transistor TR6 of the overload prevention circuit 208 is not operated.

Meanwhile, when the user selects the high velocity rotation, as shown in FIG. 6, the microcomputer 205 outputs a PWM control signal a4 having the first duty cycle.

Accordingly, the fourth transistor TR4 is on/off driven by the PWM control signal a4 having the first duty cycle, and the pulse signal having the first duty cycle is generated through the emitter. The capacitor C6 generates the low DC voltage c4, such as the voltage of 1V by charging the pulse signal having the first duty cycle.

The switching regulator 207 generates a certain driving pulse signal of high frequency having the second duty cycle by the low DC voltage c4 discharged from the capacitor C6, such as the pulse signal of the frequency of 20 KHz.

Accordingly, the driving-on time of the fifth transistor TR5 is lengthened to be longer than the driving-offtime thereof according to the driving pulse signal d4 of the second duty cycle, so the DC hood motor M is rotated at high velocity.

In such a situation, since the voltage at both ends of the resistor R6 is not enough for the turning-on condition, the sixth transistor TR6 of the overload prevention circuit 208 is not operated.

Figure 12:
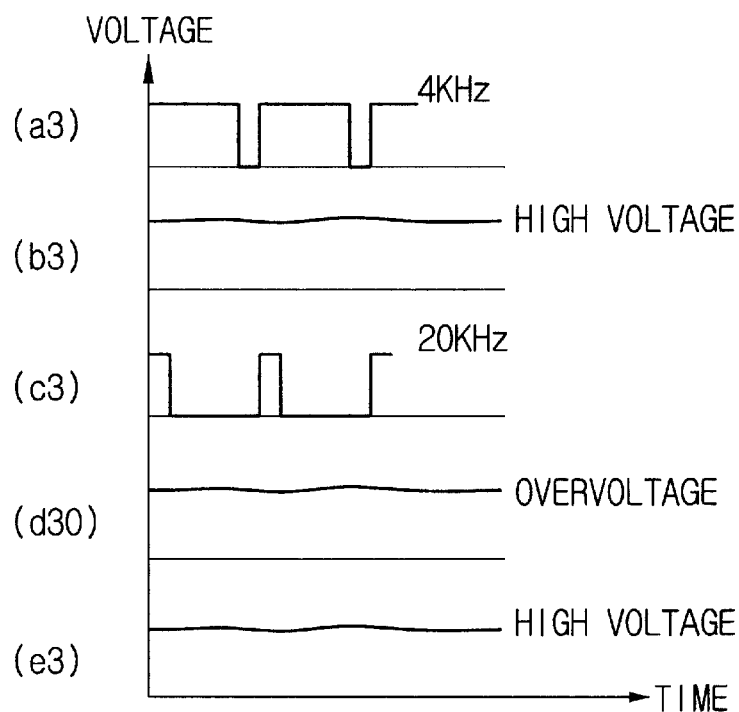
FIGS. 12 and 13 are waveforms for explaining the operation of the control circuit of FIG. 9, when the hood motor is abnormally operated.
Figure 13:
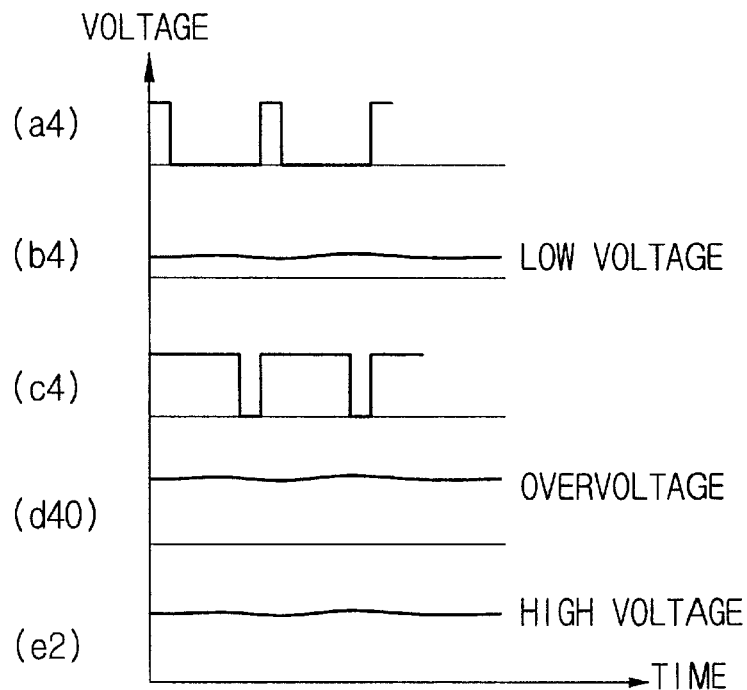

FIGS. 12 and 13 are waveforms for explaining the operation of the control circuit of the hood motor when the hood motor is abnormally operated.

As shown in FIG. 12, while the DC hood motor M is rotated at low velocity, the presence of a foreign substance causes the constraint on the rotation of the DC hood motor M, the electric current increase at the resistor R6, and the overvoltage d30 at both ends of the resistor R6.

When there occurs overvoltage at both ends of the resistor R6, the sixth transistor TR6 of the overload prevention circuit 208 is turned on, and the high voltage at both ends of the resistor R6 is applied to the fifth transistor TR5.

Accordingly, the fifth transistor TR5 maintains on-status by a high voltage e3 at the base thereof, and the large amount of electric current flows through the rectifier circuit section 200, and the fuse 202 is opened. Here, the high voltage e3 is the combination of the high voltage from the sixth transistor TR6 and the driving pulse signal c3 of the switching regulator 207.

By the opening of the fuse 201, the DC hood motor M stops operation, and possible harm caused by the overcurrent is prevented.

Meanwhile, as shown in FIG. 13, when the user selects high velocity rotation of the DC hood motor M, the sixth transistor TR6 is turned on by overvoltage d40 at both ends of the resistor R1 if there is presence of a foreign substance at the DC hood motor M.

By the turning-on of the sixth transistor TR6, the fifth transistor TR5 receives a voltage e4, which is the combination of a driving pulse signal c4 from the switching regulator 207 and a high voltage from the sixth transistor TR6.

Accordingly, the fifth transistor TR5 maintains on-status, and the fuse 201 is open since there is overcurrent flowing therethrough.

Next, the third preferred embodiment of the present invention will be described in greater detail with reference to the accompanying drawings.

Figure 14:
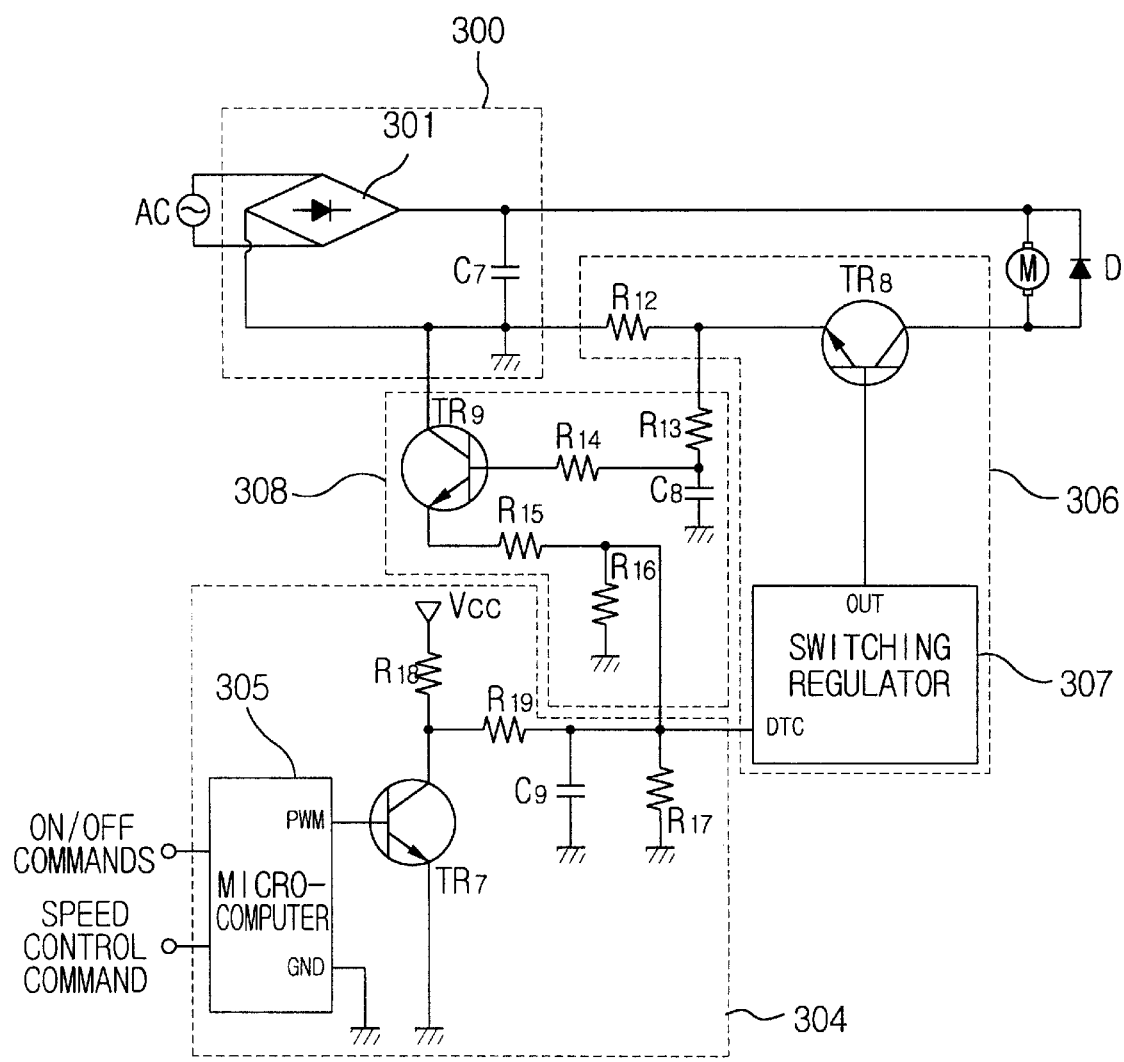
FIG. 14 is a view for showing a driving control circuit of a hood motor according to a third preferred embodiment of the present invention.

FIG. 14 is a view for showing the driving control circuit of a hood motor according to the third preferred embodiment of the present invention.

As shown in FIG. 14, the driving control circuit of the hood motor according to the third preferred embodiment of the present invention includes a rectifier circuit section 300, a controlling section 304, a driving circuit section 306, an overload prevention circuit 308, and a DC hood motor M.

The rectifier circuit section 300 includes a bridge diode 301, and a smoothing capacitor C7. Unlike the first and second preferred embodiments, the fuses 101 and 202 are omitted in the third preferred embodiment.

The controlling section 304 includes a microcomputer 305, and a seventh transistor TR7.

The microcomputer 305 includes an input port for inputting on/off commands and a velocity control command from a user. Further, the microcomputer 305 includes a control signal output port PWM for generating a PWM control signal of a certain frequency having the duty cycle varied according to the high/low velocity rotation of the DC hood motor M in response to the on/off commands and the velocity control command from the user, and a ground port GND.

Here, the microcomputer 305 generates the PWM control signal of a certain frequency having the second duty cycle such as the frequency of 4 KHz when the low velocity rotation is selected by the user, while the microcomputer 305 generates the PWM control signal of the first duty cycle when the high velocity rotation is selected.

The seventh transistor TR7 includes a base connected with the control signal output port PWM of the microcomputer 305, and a collector connected with the voltage source Vcc through the resistor R18. The collector of the seventh transistor TR7 and a resistor R18 are connected with the driving circuit section 306 through a resistor R19. Here, the resistors R18 and R19 are voltage dividing resistors for dividing the voltage from the voltage source Vcc.

Further, between the seventh transistor TR7 and the driving circuit section 306, a capacitor C9, and a resistor R17 are parallel connected, respectively.

The seventh transistor TR7 is on/off driven according to the duty cycle of the PWM control signal received from the microcomputer 205, and outputs the phase-inverted pulse signal of the PWM control signal through the collector thereof. The pulse signal generated at the collector of the seventh transistor TR7 is divided by the voltage dividing resistors R18 and R19, charged at the capacitor C9, and is outputted to the driving circuit section 306 in the form of DC voltage.

The driving circuit section 306 includes a switching regulator 307, an eighth transistor TR8, and a resistor R12.

The switching regulator 307 outputs a certain driving pulse signal of a certain frequency having the duty cycle varied according to the level of DC voltage generated by the charging/discharging of the capacitor C9 through the signal input port DTC, such as the driving pulse signal of frequency of 20 KHz, through the signal output port OUT.

Here, if the high DC voltage such as the voltage of 3V is inputted through the signal input port DTC of the switching regulator 307, the switching regulator 307 generates the driving pulse signal having the first duty cycle,while the switching regulator 307 generates the driving pulse signal having the second duty cycle when the low voltage such as the voltage of 1V is inputted.

The eighth transistor TR8 is on/off driven according to the duty cycle of the driving pulse signal received at the base from the switching regulator 307.

The overload prevention circuit 308 includes a ninth transistor TR9, voltage dividing resistors R13, R14, and R15, R16, and a capacitor C8.

The ninth transistor TR9 includes a base connected between the eighth transistor TR8 of the driving circuit section 306 and one end of the resistor R12 through the voltage dividing resistors R13 and R14, and a collector connected with the other end of the resistor R12. Further, an emitter of the ninth transistor TR9 is connected with the signal output port OUT of the switching regulator 307 through the voltage dividing resistors R15 and R16.

The ninth transistor TR9 is turned on when there is overvoltage at both ends of the resistor R12 of the driving circuit section 306, and disables the operation of the switching regulator 307 by supplying overvoltage at the signal input port DTC of the switching regulator 307, such as the voltage of 3V.

Next, the operation of the third preferred embodiment of the present invention will be described in greater detail with reference to FIGS. 15 and 16.

Figure 15:
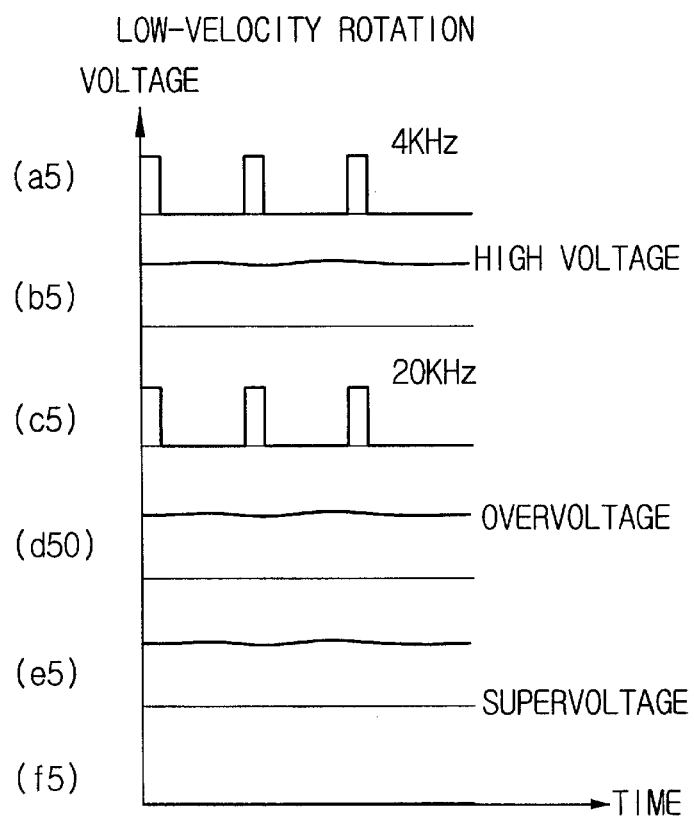
FIGS. 15 and 16 are waveforms for explaining the operation of the control circuit of FIG. 14, when the hood motor is abnormally operated.
Figure 16:
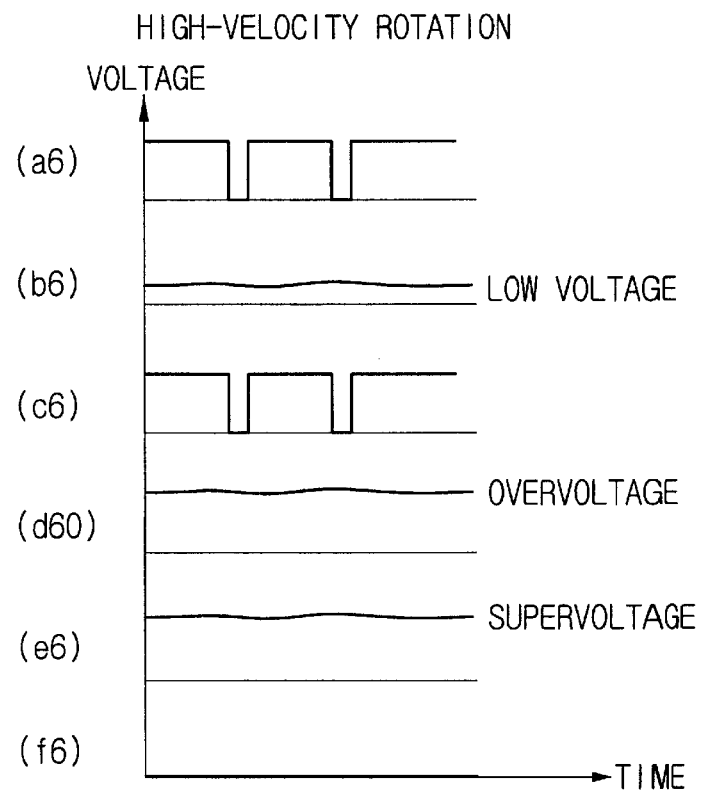

FIGS. 15 and 16 are waveforms for explaining the operation of the control circuit of the hood motor of FIG. 14 when the hood motor is normally operated.

First, as the user selects the low-velocity rotation while giving the DC hood motor-on command, as shown in FIG. 15, the microcomputer 205 outputs a PWM control signal as of the first duty cycle.

The seventh transistor TR7 is on/off driven according to the duty cycle of the PWM control signal a5. The pulse signal, which is divided from the voltage source Vcc by the voltage dividing resistors R18 and R19, is phase-inverted from the PWM control signal a5, and is generated through the collector of the seventh transistor TR7. Accordingly, by the inverted first duty cycle of the PWM control signal, the duty cycle of the pulse signal generated at the collector of the seventh transistor TR7 is increased.

Meanwhile, the pulse signal divided by the voltage dividing resistors R18 and R19 generates a high DC voltage b5 such as the voltage of 3V, by the charging/discharging of the capacitor C9.

When the switching regulator 307 receives the high DC voltage b5, the switching regulator 307 outputs a certain driving pulse signal c5 of high frequency having the first duty cycle, such as the frequency of 20 KHz, corresponding to the high DC voltage b5.

Accordingly, the driving-on time of the eighth transistor TR8 is lengthened to be longer than the driving-offtime thereof according to the duty cycle of the driving pulse signal c5 generated from the switching regulator 307, the DC hood motor M is rotated at low velocity.

Here, when there is a foreign substance in the vent blowers of the DC hood motor M constraining the rotation of the hood motor M, the electric current flowing through the resistor R12 is increased, and there occurs overvoltage d50 at both ends of the resistor R12.

When there occurs overvoltage at both ends of the resistor R12, the ninth transistor TR9 of the overload prevention circuit 308 is turned on, and the high voltage, which is divided from the overvoltage d50 at both ends of the resistor R12, is applied to the signal input port DTC of the switching regulator 307.

Accordingly, supervoltage e5, which is the combination of the DC voltage b5 by the capacitor C9 and the high voltage divided by the voltage dividing resistors R15 and R16, is applied to the switching regulator 307. By the supervoltage e5, such as 3V higher than the allowed value for the operation of the switching regulator 307, the operation of the switching regulator 307 is disabled.

Accordingly, the driving pulse signal f5 generated through the signal output port OUT of the switching regulator 307 maintains low level, while the eighth transistor TR8 maintains off-status. As a result, the operation of the DC hood motor M is stopped.

Meanwhile, as shown in FIG. 16, while the DC hood motor M is rotated at high velocity by the selection of the user, overvoltage d60 occurs at both ends of the resistor R12 when there is a foreign substance in the vent blowers of the DC hood motor M constraining the rotation of the DC hood motor M.

The ninth transistor TR9 is turned on by the overvoltage d60 at both ends of the resistor R12, while the high voltage, which is divided from the overvoltage d60 at both ends of the resistor R12 by the voltage dividing resistors R15 and R16, is applied to the signal input port DTC of the switching regulator 307.

Accordingly, the operation of the switching regulator 307 is disabled by the supervoltage e6 such as 3V, which is the combination of the DC voltage b6 of the low voltage by the charging of the capacitor C9 and the high voltage divided by the voltage dividing resistors R15 and R16. Here, the driving pulse signal f6 outputted from the signal output port OUT of the switching regulator 307 maintains the low-level, while the eighth transistor TR8 is turned off to stop the operation of the DC hood motor M.

As described above, in the driving control circuit of the hood motor according to the preferred embodiments of the present invention, by the inexpensive control circuit being substituted for the conventional expensive switching circuit, the manufacturing cost of the microwave oven is considerably reduced, while the productivity thereof is increased. Further, by solving the problem of having abnormalities such as the poor contact of the switches, the stable controlling of the motor can be guaranteed. Further, by the overload prevention circuit, the fuse is opened or the operation of the driving circuit is stopped to protect the DC hood motor and the circuit components when there occurs abnormalities in the DC hood motor.

While the driving control circuit of the hood motor of the present invention has been particularly shown and described with reference to the preferred embodiments thereof, it will be understood by those skilled in the art that various changes in form and details may be effected therein without departing from the spirit and scope of the invention as defined by the appended claims.

What is claimed is:
1. A driving control circuit for driving a motor, comprising:
rectifier circuit means for rectifying an alternating current voltage into a direct current voltage and for supplying the direct current voltage to said motor;
controlling means for generating a control signal for controlling the operation of said motor;
driving circuit means coupled to said controlling means for controlling the operation of said motor in response to said control signal of said controlling means; and
said controlling means comprising:
a microcomputer for generating a pulse width modulation control signal having a duty cycle varied in accordance with the selection of a user as to a low or a high velocity rotation;
a transistor on/off driven according to said duty cycle of said pulse width modulation control signal for generating a pulse signal; and
a capacitor for charging the pulse signal, thereby outputting the direct current voltage.
2. The driving control circuit of claim 1, wherein said pulse signal is phase-inverted from said pulse width modulation control signal or has the same phase as said pulse width modulation control signal.
3. The driving control circuit of claim 1, with said driving circuit means comprising:
a switching regulator for generating a driving pulse signal having a duty cycle which is varied for low or high rotation according to said control signal generated from said controlling means;
a driving transistor on/off driven according to said duty cycle of said driving pulse signal for rotating said motor at a low or a high velocity; and
a resistor disposed on a current path of said motor.
4. A driving control circuit for driving a motor, comprising:
a motor;
rectifier circuit means for rectifying an alternating current voltage into a direct current voltage, and for supplying the direct current voltage to said motor;
controlling means for generating a control signal for controlling the operation of said motor;
driving circuit means coupled to said controlling means for controlling the operation of said motor in response to said control signal of said controlling means; and
overload prevention means coupled to both said driving circuit means and a current path of said motor for stopping the operation of said motor by providing a current detecting element disposed on said current path of said motor and by detecting an overvoltage from a signal that corresponds to current flowing through said motor and that is output from said current detecting element.
5. The driving control circuit as claimed in claim 4, with said overload prevention means comprising:
an overload transistor for bypassing said control signal generated from said controlling means to rectifier circuit means when turned on by said overvoltage generated from said driving circuit means; and
a voltage dividing resistor for enabling said overload transistor to be turned on by dividing said overvoltage generated from said driving circuit means.
6. The driving control circuit of claim 5, wherein said overload transistor feeds back said overvoltage to said driving circuit means.
7. The driving control circuit of claim 5, with said overload prevention means further comprising a second voltage dividing resistor coupled to said overload transistor for applying high voltage derived from said overvoltage to said driving circuit means when said overload transistor is turned on.
8. The driving control circuit of claim 5, with said driving circuit means comprising:
a switching regulator for generating a driving pulse signal having a duty cycle which is varied for the low or the high rotation according to said control signal from said controlling means; and a driving transistor on/off driven according to said duty cycle of said driving pulse signal for rotating said motor at low, or high velocity.

9. The driving control circuit of claim 8, wherein said switching regulator is disabled to change the speed of said motor when said overvoltage is higher than a predetermined voltage.

10. A controller for controlling a motor, comprising:

a power source adapted to be coupled to said motor;

a control circuit generating a first control signal representing a first speed of said motor;

a driving circuit coupled to said control circuit to receive said control signal, coupled between said motor and said power source to drive said motor in accordance with said first control signal;

an overload prevention circuit coupled to said driving circuit to detect an overload voltage applied from said motor to said driving circuit, generating a second control signal representing a second speed of said motor when said overload voltage is detected; and said driving circuit driving said motor in accordance with said second control signal regardless of said first control signal generated from said control circuit.

11. The controller of claim 10, with said driving circuit comprising:

a switching regulator coupled to said control circuit to receive said first control signal, generating a pulse signal in accordance with said first control signal; and a driving transistor coupled to said switching regulator to receive said pulse signal, coupled between said motor and said power source to drive said motor at said first speed.

12. The controller of claim 11, with said driving circuit, comprising:

said switching regulator generating a second pulse signal in accordance with said second control signal supplied from said overload prevention circuit; and said driving transistor driving said motor at said second speed in response to said second pulse signal.

13. The controller of claim 11, further comprising a load resistor coupled to said driving circuit, dividing an overload voltage generated from said motor and applied to said driving circuit.

14. The controller of claim 13, with said overload prevention circuit comprising a load transistor coupled to both ends of said load resistor, said load transistor generating said second control signal.

15. The controller of claim 14, with said load transistor having a first terminal coupled to one end of said load resistor, a second terminal coupled to the other end of said load resistor, and a third terminal coupled to said driving circuit, said second control signal transmitted to said driving circuit through said third terminal.

16. The controller of claim 14, with said load transistor having a first terminal coupled to one end of said load resistor, a second terminal coupled to the other end of said load resistor, and a third terminal coupled between said switching regulator and said driving transistor.

17. The controller of claim 14, with said load transistor having a first terminal coupled to one end of said load resistor, a second terminal coupled to the other end of said load resistor, and a third terminal coupled between said driving and said control circuit.

18. The controller of claim 10, wherein said first control signal and said second control signal are direct current voltage signals.

19. The controller of claim 10, wherein said second control signal disables said first control signal.

20. The controller of claim 10, wherein said second control signal modifies said first control signal.

21. The controller of claim 10, wherein said first speed is a low speed while said second speed is a high speed.

* * * * *